(12) United States Patent
Liu et al.

(10) Patent No.: US 11,679,670 B2
(45) Date of Patent: Jun. 20, 2023

(54) TWO-GEAR BRIDGE DRIVING SYSTEM AND VEHICLE

(71) Applicant: Schaeffler Technologies AG & Co. KG, Herzogenaurach (DE)

(72) Inventors: Lei Liu, Shanghai (CN); Qingquan Li, Hangzhou (CN)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/627,880

(22) PCT Filed: Jul. 17, 2020

(86) PCT No.: PCT/CN2020/102550
§ 371 (c)(1),
(2) Date: Jan. 18, 2022

(87) PCT Pub. No.: WO2021/008596
PCT Pub. Date: Jan. 21, 2021

(65) Prior Publication Data
US 2022/0250468 A1    Aug. 11, 2022

(30) Foreign Application Priority Data
Jul. 18, 2019  (CN) .......................... 201910649449.3

(51) Int. Cl.
*B60K 17/02*    (2006.01)
*B60K 17/08*    (2006.01)
(Continued)

(52) U.S. Cl.
CPC .............. *B60K 17/02* (2013.01); *B60K 17/08* (2013.01); *B60K 17/046* (2013.01); *B60K 17/12* (2013.01); *B60K 17/16* (2013.01); *B60K 2001/001* (2013.01); *B60Y 2200/91* (2013.01); *B60Y 2400/73* (2013.01); *F16H 37/082* (2013.01);
(Continued)

(58) Field of Classification Search
CPC ...... B60K 17/02; B60K 17/08; B60K 17/046; B60K 17/16
See application file for complete search history.

(56) References Cited

U.S. PATENT DOCUMENTS 9,435,415 B2    9/2016  Gassmann
10,480,622 B2 * 11/2019  Kim ..................... B60K 7/0007
2022/0333670 A1 * 10/2022  Mattsson ................ B60K 1/00

FOREIGN PATENT DOCUMENTS

CN           2276904       3/1998
CN         204749860      11/2015
(Continued)

*Primary Examiner* — Derek D Knight
(74) *Attorney, Agent, or Firm* — Volpe Koenig, P.C.

(57) ABSTRACT

A two-gear bridge driving system. A speed changer of the two-gear bridge driving system includes a dual-planetary gear mechanism, the dual-planetary gear mechanism has only one sun gear, the sun gear is fixed with respect to a speed changer input gear, and the sun gear and one planetary gear in the dual gear are always in an engagement state. Compared with the two-gear bridge driving system in the prior art, the two-gear bridge driving system provided here is simpler in structure, lower in costs and lower in weight, and good NVH control is easily achieved. Also provided is a vehicle including the two-gear bridge driving system.

17 Claims, 5 Drawing Sheets

(51) Int. Cl.
    *B60K 17/04*        (2006.01)
    *B60K 17/12*        (2006.01)
    *B60K 17/16*        (2006.01)
    *B60K 1/00*         (2006.01)
    *F16H 37/08*       (2006.01)

(52) U.S. Cl.
    CPC ................ *F16H 2200/2035* (2013.01); *F16H 2200/2097* (2013.01)

(56) References Cited

FOREIGN PATENT DOCUMENTS

| | | |
|---|---|---|
| CN | 105333084 | 2/2016 |
| DE | 102017111036 | 11/2018 |

\* cited by examiner

A # TWO-GEAR BRIDGE DRIVING SYSTEM AND VEHICLE

CROSS-REFERENCE TO RELATED APPLICATIONS

This application is the U.S. National Phase of PCT Appln. No. PCT/CN2020/102550, filed Jul. 17, 2020, which claims priority from Chinese Patent Application No. 201910649449.3, filed Jul. 18, 2019, the entire disclosures of which are incorporated by reference herein.

TECHNICAL FIELD

The present disclosure relates to the field of vehicles, in particular to a two-gear bridge driving system for a vehicle and a vehicle comprising the two-gear bridge driving system.

BACKGROUND

Currently, bridge driving systems can be used to drive pure electric vehicles and hybrid vehicles FIG. 1 is a schematic diagram showing a connection structure of a two-gear bridge driving system in the prior art (see U.S. Pat. No. 9,435,415 B2). As shown in FIG. 1, the two-gear bridge driving system comprises an electric motor EM, a speed changer, a differential mechanism DM and two half shafts, all of which are integrated together Specifically, the electric motor EM has an output shaft S1 and an electric motor output gear G1 fixed to the output shaft S1

Further, the speed changer comprises a hollow input shaft S2, a speed changer input gear G2 fixed to the input shaft S2, two planetary gear mechanisms, and two clutches K1, K2

The input shaft S2 is parallel to the output shaft S1 and is offset relative to the output shaft S1. The speed changer input gear G2 and the electric motor output gear G1 are always in an engagement state, so that the speed changer can receive the torque from the electric motor EM A first planetary gear mechanism comprises a first sun gear SU1, a plurality of first planetary gears PG1, and a first ring gear R1 which are engaged with one another, and a planetary carrier P for retaining the plurality of first planetary gears PG1. The first sun gear SU1 is fixed to the input shaft S2. The planetary carrier P is drivingly coupled to a differential mechanism housing of the differential mechanism DM. The first ring gear R1 is connected to a housing of the speed changer via a first clutch K1, so that the engagement of the first clutch K1 enables the first ring gear R1 to be fixed relative to the housing of the speed changer. Similarly, a second planetary gear mechanism comprises a second sun gear SU2, a plurality of second planetary gears PG2, and a second ring gear R2 which are engaged with one another, and a planetary carrier P for retaining the plurality of second planetary gears PG2. The second sun gear SU2 is fixed to the input shaft S2. The second planetary gear mechanism and the first planetary gear mechanism share one planetary carrier P. The second ring gear R2 is connected to the housing of the speed changer via the second clutch K2, so that the engagement of the second clutch K2 enables the second ring gear R2 to be fixed relative to the housing of the speed changer. The first clutch K1 and the second clutch K2 are both friction clutches In this way, when the first clutch K1 is engaged, a torque transmission path from the electric motor EM is as follows: electric motor EM→output shaft S1→electric motor output gear G1→speed changer input gear G2→input shaft S2→first sun gear SU1→first planetary gear PG1→planetary carrier P→differential mechanism DM; and at this time, the speed changer can achieve the following first transmission ratio: $(1+Z_{R1}/Z_{SU1})\times(Z_{G2}/Z_{G1})$, wherein $Z_{R1}$ is the number of teeth of the first ring gear R1, $Z_{SU1}$ is the number of teeth of the first sun gear SU1, $Z_{G1}$ the number of teeth of the electric motor output gear G1, and $Z_{G2}$ is the number of teeth of the speed changer input gear G2

When the second clutch K2 is engaged, a torque transmission path from the electric motor EM is as follows: electric motor EM→output shaft S1→electric motor output gear G1→speed changer input gear G2→input shaft S2→second sun gear SU2→second planetary gear PG2→planetary carrier P→differential mechanism DM; and the speed changer can achieve the following second transmission ratio: $(1+Z_{R2}/Z_{SU2})\times(Z_{G2}/Z_{G1})$, wherein $Z_{R2}$ is the number of teeth of the second ring gear R2, $Z_{SU2}$ is the number of teeth of the second sun gear SU2, $Z_{G1}$ is the number of teeth of the electric motor output gear G1, and $Z_{G2}$ is the number of teeth of the speed changer input gear G2

Despite its ability to realize two-stage and two-gear driving, the bridge driving system shown in FIG. 1 has the following disadvantages:

i. the two planetary gear mechanisms correspond to the two sun gears SU1, SU2. The two sun gears SU1, SU2 require additional support structures, thus leading to a bridge driving system with excessive assemblies, larger axial length, higher cost, and larger size and weight as a whole;

ii. the two sun gears SU1, SU2 are poor in support rigidity and stability, and thus good NVH control is hard to achieve; and iii. the transmission ratios achieved by the speed changer of the two-gear bridge driving system are both small, so a high-power electric motor is required to meet the performance requirements, resulting in high system costs.

SUMMARY

The present disclosure is made in view of the deficiencies of the prior art as described above. An object of the present disclosure is to provide a novel two-gear bridge driving system, which is simpler in structure, lower in costs, slighter in weight, and good NVH control is easily achieved compared with the above-mentioned two-gear bridge driving system according to the prior art. Another object of the present disclosure is to provide a vehicle comprising the above-mentioned two-gear bridge driving system.

To achieve the above-mentioned objects, the present disclosure adopts the following technical solutions.

The present disclosure provides a two-gear bridge driving system as follows, the two-gear bridge driving system comprising an electric motor having an output shaft; and a speed changer comprising an input shaft to be drivingly coupled to the output shaft, a dual-planetary gear mechanism, a first clutch and a second clutch wherein the dual-planetary gear mechanism comprises one sun gear, a first planetary gear, a second planetary gear, a planetary carrier, and a first ring gear and a second ring gear, the sun gear is fixed to the input shaft and is always in engagement with the first planetary gear, the first planetary gear and the second planetary gear are fixed to one another, the first ring gear and the first planetary gear are always in an engagement state, the second ring gear and the second planetary gear are always in an engagement state, and the planetary carrier is used for transmitting torque to the outside, an the engagement of the first clutch enables the first ring gear to be fixed with respect to a housing of the speed changer, and the disengagement of the first clutch allows the first ring gear to rotate relative to the housing of the speed changer; the engagement of the second clutch enables the second ring gear to be fixed with respect to the housing of the speed changer, and the disengagement of the second clutch allows the second ring gear to rotate relative to the housing of the speed changer The present disclosure further provides a two-gear bridge driving system as follows, the two-gear bridge driving system comprises an electric motor having an output shaft; and a speed changer comprising an input shaft to be drivingly coupled to the output shaft, a dual-planetary gear mechanism, a first clutch and a second clutch wherein the dual-planetary gear mechanism comprises one sun gear, a first planetary gear, a second planetary gear, a planetary carrier, and a second ring gear, the sun gear is fixed to the input shaft and is always in engagement with the first planetary gear, the first planetary gear and the second planetary gear are fixed to one another, the second ring gear and the second planetary gear are always in an engagement state, and the planetary carrier is used for transmitting torque to the outside, an the engagement of the first clutch enables the planetary carrier to be fixed with respect to the sun gear, and the disengagement of the first clutch allows the planetary carrier to rotate relative to the sun gear; the engagement of the second clutch enables the second ring gear to be fixed with respect to a housing of the speed changer, and the disengagement of the second clutch allows the second ring gear to rotate relative to the housing of the speed changer Preferably, the input shaft of the speed changer is parallel to the output shaft of the electric motor, and the input shaft is offset relative to the output shaft More preferably, the electric motor has an electric motor output gear fixed to the output shaft, the speed changer comprises a speed changer input gear fixed to the input shaft, the speed changer input gear and the electric motor output gear are always in an engagement state, and the first planetary gear is closer to the side where the speed changer input gear is located than the second planetary gear More preferably, the first clutch is disposed between the speed changer input gear and the planetary carrier, and the first clutch enables the speed changer input gear to be fixed with respect to the planetary carrier, so that the sun gear is fixed with respect to the planetary carrier More preferably, the electric motor output gear is disposed at one side end of the output shaft in the axial direction to form a cantilever structure, and the electric motor and the dual-planetary gear mechanism are located on two opposite sides of the electric motor output gear in the axial direction, respectively More preferably, the electric motor output gear is disposed at an intermediate position of the output shaft other than the two side ends thereof in the axial direction, and the two side ends of the output shaft in the axial direction are supported by bearings, and the electric motor and the dual-planetary gear mechanism are located on the same side of the electric motor output gear in the axial direction More preferably, the two-gear bridge driving system further comprises a differential mechanism and two half shafts protruding from the differential mechanism, the planetary carrier is drivingly coupled to a differential mechanism housing of the differential mechanism, the two half shafts and the input shaft are in a co-axial arrangement, and the input shaft is a hollow shaft, so that one half shaft of the two half shafts passes through the input shaft and can rotate independently of the input shaft More preferably, the first clutch and the second clutch are both wet multi-plate clutches The present disclosure further provides a vehicle as follows, comprising the two-gear bridge driving system according to any one of the above-mentioned technical solutions By adopting the above-mentioned technical solutions, the present disclosure provides a novel two-gear bridge driving system and a vehicle comprising the two-gear bridge driving system. A speed changer of the two-gear bridge driving system comprises a dual-planetary gear mechanism, the dual-planetary gear mechanism comprises only one sun gear, the sun gear is fixed with respect to a speed changer input gear, and the sun gear and one planetary gear in the dual gear are always in an engagement state. Compared with the two-gear bridge driving system in the prior art, the two-gear bridge driving system in the present disclosure is simpler in structure, lower in costs and slighter in weight, and good NVH control is easily achieved.

DESCRIPTION OF REFERENCE NUMERALS

In the figures there are electric motor EM, output shaft S1, electric motor output gear G1, input shaft S2, speed changer input gear G2, sun gear SU, first sun gear SU1, second sun gear SU2, first planetary gear PG1, second planetary gear PG2, planetary carrier P, first ring gear R1, second ring gear R2, first clutch K1, second clutch K2, differential mechanism DM, first half shaft HS1, second half shaft HS2, first bearing B1, second bearing B2, and third bearing B3.

DETAILED DESCRIPTION

Exemplary embodiments will be described below with reference to the drawings. It should be understood that the specific description is only used to teach those skilled in the art how to implement the present disclosure, and is not intended to be exhaustive of all possible variations of the present disclosure, nor to limit the scope of the present invention.

In the present disclosure, "driving coupling" refers to the connection of two components in a manner of transmitting driving force/torque therebetween, which may, unless indicated otherwise, mean that the two components are directly connected or coupled via a transmission structure of the prior art such as a gear mechanism to enable the transmission of driving force/torque between the two components. In addition, in the present invention, "axial direction" refers to the axial direction of the output shaft of the electric motor and the input shaft of the speed changer, "one axial side" refers to the right side in FIGS. 2A to 2D, and the "the other axial side" refers to the left side in FIGS. 2A to 2D.

A structure of the two-gear bridge driving system according to the first embodiment.

Figure 1:
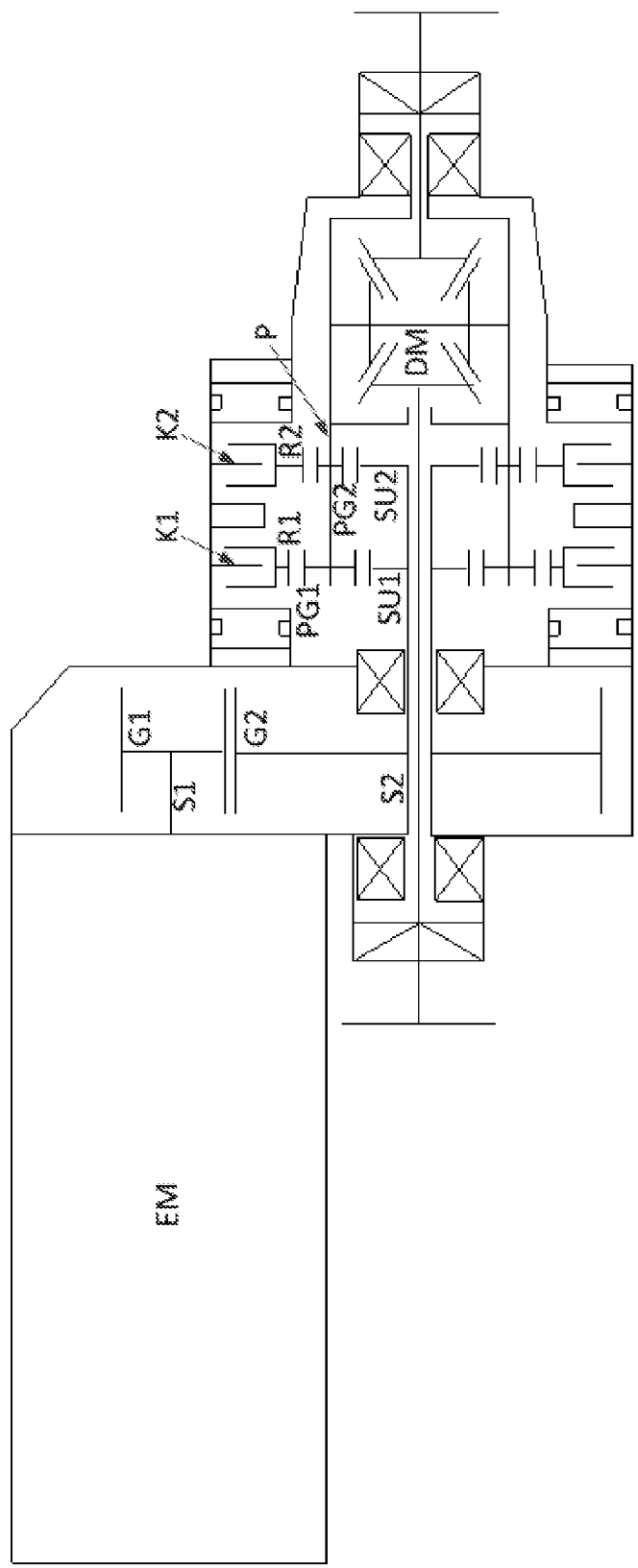
FIG. 1 is a schematic diagram showing a connection structure of a two-gear bridge driving system according to the prior art.
Figure 2A:
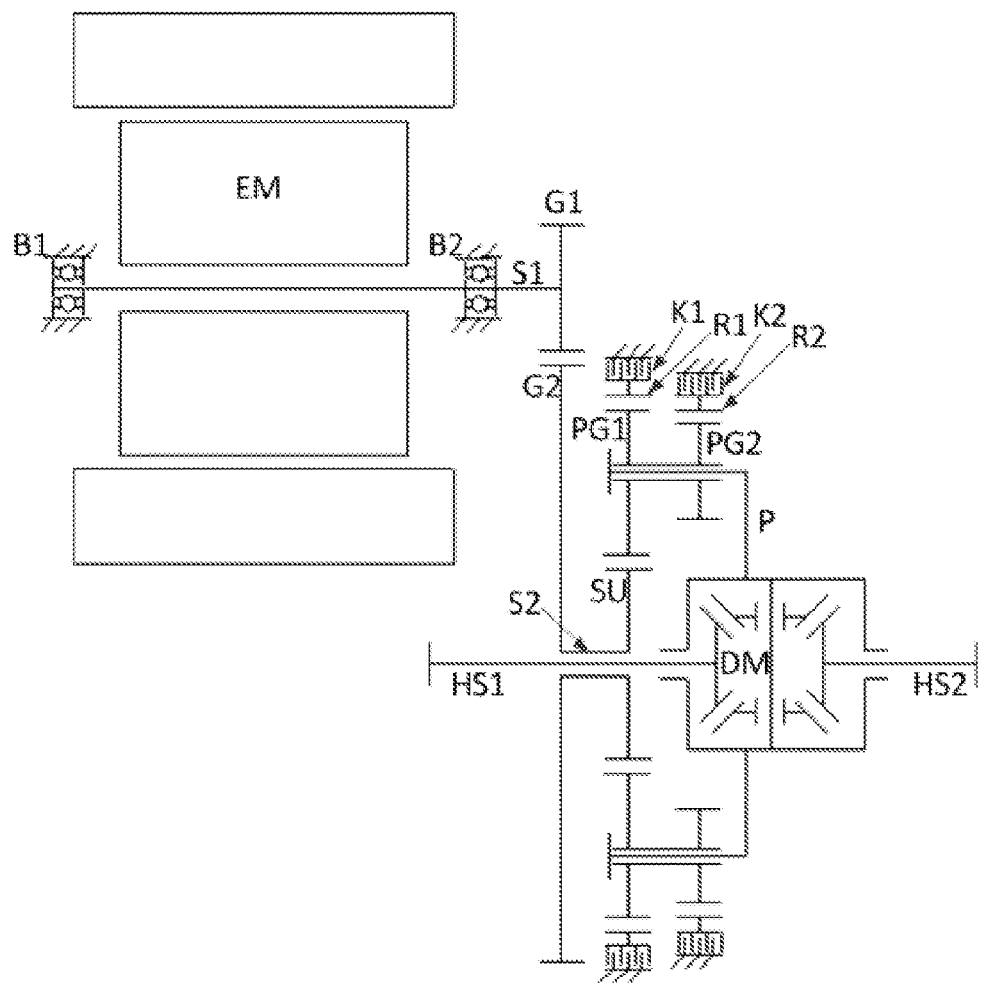
FIG. 2A is a schematic diagram showing a connection structure of the two-gear bridge driving system according to the first embodiment.

As shown in FIG. 2A, the two-gear bridge driving system according to the first embodiment comprises an electric motor EM, a speed changer, a differential mechanism DM and two half shafts which realize the driving coupling.

Specifically, in this embodiment, the electric motor EM has an output shaft S1 for outputting torque and an electric motor output gear G1 fixed to the output shaft S1. It should be noted that in the present disclosure, when it is stated that the "gear" is fixed to the "shaft", it usually means that the gear and the shaft can rotate together, while the gear and the shaft are allowed to be not completely fixed along the axial direction of the shaft. Two bearings for supporting the output shaft S1, that is, the first bearing B1 and the second bearing B2, are arranged in the axial direction. The first bearing B1 supports the other side end of the output shaft S1 in the axial direction, and the second bearing B2 supports the part, close to one side end, of the output shaft S1 in the axial direction, so that the protruding part, comprising one side end, of the output shaft S1 in the axial direction protrudes from the second bearing B2 toward one axial side. The electric motor output gear G1 is fixedly mounted on one side end of the output shaft S1 in the axial direction, so that the protruding portion of the output shaft S1 and the electric motor output gear G1 form a cantilever structure relative to the second bearing B2.

In this embodiment, the speed changer comprises a hollow input shaft S2, a speed changer input gear G2 fixed to the input shaft S2, a dual-planetary gear mechanism, and two clutches K1, K2.

The input shaft S2 of the speed changer is parallel to the output shaft S1 of the electric motor EM and is offset relative to the output shaft S1 of the electric motor EM. The speed changer input gear G2 and the electric motor output gear G1 are always in an engagement state, so that the speed changer can receive the torque from the electric motor EM.

The dual-planetary gear mechanism is located on one axial side of the speed changer input gear G2, and the dual-planetary gear comprises one sun gear SU, a plurality of first planetary gears PG1, a plurality of second planetary gears PG2, a first ring gear R1, a second ring gear R2 and a planetary carrier P. The sun gear SU is fixed to the input shaft S2 of the speed changer and is always in engagement with the plurality of first planetary gears PG1, and the first planetary gear PG1 is closer to the side where the speed changer input gear G2 is located than the second planetary gear PG2. The plurality of first planetary gears PG1 and the plurality of second planetary gears PG2 share the planetary carrier P, and each first planetary gear PG1 is fixedly connected to a corresponding second planetary gear PG2 to form a dual gear. In fact, as long as each first planetary gear PG1 and a corresponding second planetary gear PG2 can rotate together, it is not necessary for the first planetary gear PG1 and the corresponding second planetary gear PG2 to be rigidly connected. The first ring gear R1 and the plurality of first planetary gears PG1 are always in an engagement state, and the second ring gear R2 and the plurality of second planetary gears PG2 are always in an engagement state. The planetary carrier P is used for transmitting torque to the differential mechanism DM.

Further, the first ring gear R1 is connected to the housing of the speed changer via the first clutch K1, so that the engagement of the first clutch K1 enables the first ring gear R1 to be fixed relative to the housing of the speed changer. The second ring gear R2 is connected to the housing of the speed changer via the second clutch K2, so that the engagement of the second clutch K2 enables the second ring gear R2 to be fixed relative to the housing of the speed changer. In this embodiment, the first clutch K1 and the second clutch K2 are both wet multi-plate clutches.

Further, in this embodiment, the differential mechanism DM is a conventional bevel gear differential mechanism DM, and the housing of the bevel gear differential mechanism DM is fixedly connected to the planetary carrier P of the dual-planetary gear mechanism. Alternatively, the differential mechanism DM may be integrated into or independent of the speed changer. The two half shafts HS1, HS2 protrude from the differential mechanism DM toward two axial sides, wherein the first half shaft HS1 extends through the hollow input shaft S2 of the speed changer from the differential mechanism DM toward the other axial side, and the first half shaft HS1 can rotate independently of the input shaft S2, and the second half shaft HS2 extends from the differential mechanism DM toward one axial side. In this way, the torque from the electric motor EM can be transmitted to the differential mechanism DM via the speed changer, and then to the half shafts and wheels of the vehicle.

Therefore, in this embodiment, when the first clutch K1 is engaged, the torque transmission path from the electric motor EM is as follows: electric motor EM→output shaft S1→electric motor output gear G1→speed changer input gear G2→input shaft S2→sun gear SU→first planetary gear PG1→planetary carrier P→differential mechanism DM; and at this time, the speed changer can achieve the following first transmission ratio:$(1+Z_{R1}/Z_{SU})\times(Z_{G2}/Z_{G1})$, wherein $ZR_1$ is the number of teeth of the first ring gear R1, $Z_{SU}$ is the number of teeth of the sun gear SU, $Z_{G1}$ is the number of teeth of the electric motor output gear G1, and $Z_{G2}$ is the number of teeth of the speed changer input gear G2.

In this embodiment, when the second clutch K2 is engaged, the torque transmission path from the electric motor EM is as follows: electric motor EM→output shaft S1→electric motor output gear G1→speed changer input gear G2→input shaft S2→sun gear SU→first planetary gear PG1→second planetary gear PG2→planetary carrier P→differential mechanism DM; and at this time, the speed changer can achieve the following second transmission ratio:$(1+Z_{R2}/Z_{SU})\times(Z_{PG1}/Z_{PG2})\times(Z_{G2}/Z_{G1})$, wherein $Z_{R2}$ is the number of teeth of the second ring gear R2, $Z_{SU}$ is the number of teeth of the sun gear SU, $Z_{PG1}$ is the number of teeth of the first planetary gear PG1, $Z_{PG2}$ is the number of teeth of the second planetary gear PG2, $Z_{G1}$ is the number of teeth of the electric motor output gear G1, and $Z_{G2}$ is the number of teeth of the speed changer input gear G2.

In a normal working state, the first clutch K1 and the second clutch K2 are engaged alternately, rather than simultaneously. In addition, since the dual-planetary gear mechanism comprises only one sun gear SU and a dual-planetary gear mechanism, and the engagement of the first clutch K1 enables the first ring gear R1 to be fixed with respect to the housing of the speed changer, the engagement of the second clutch K2 enables the second ring gear R2 to be fixed with respect to the housing of the speed changer. Therefore, the transmission ratio achieved by the speed changer of the two-gear bridge driving system according to the present disclosure can be greater than that achieved by the above-mentioned speed changer of the two-gear bridge driving system in the prior art, so that the two-gear bridge driving system according to the present disclosure can use an electric motor with a lower power, thereby further reducing costs.

The specific structure of the two-gear bridge driving system according to the first embodiment has been described above, and the specific structure of two-gear bridge driving system according to the second embodiment will be described below.

The structure of the two-gear bridge driving system according to the second embodiment.

The basic structure of the two-gear bridge driving system according to the second embodiment is roughly the same as the basic structure of the two-gear bridge driving system according to the first embodiment, and only the differences between the two will be described below.

Figure 2B:
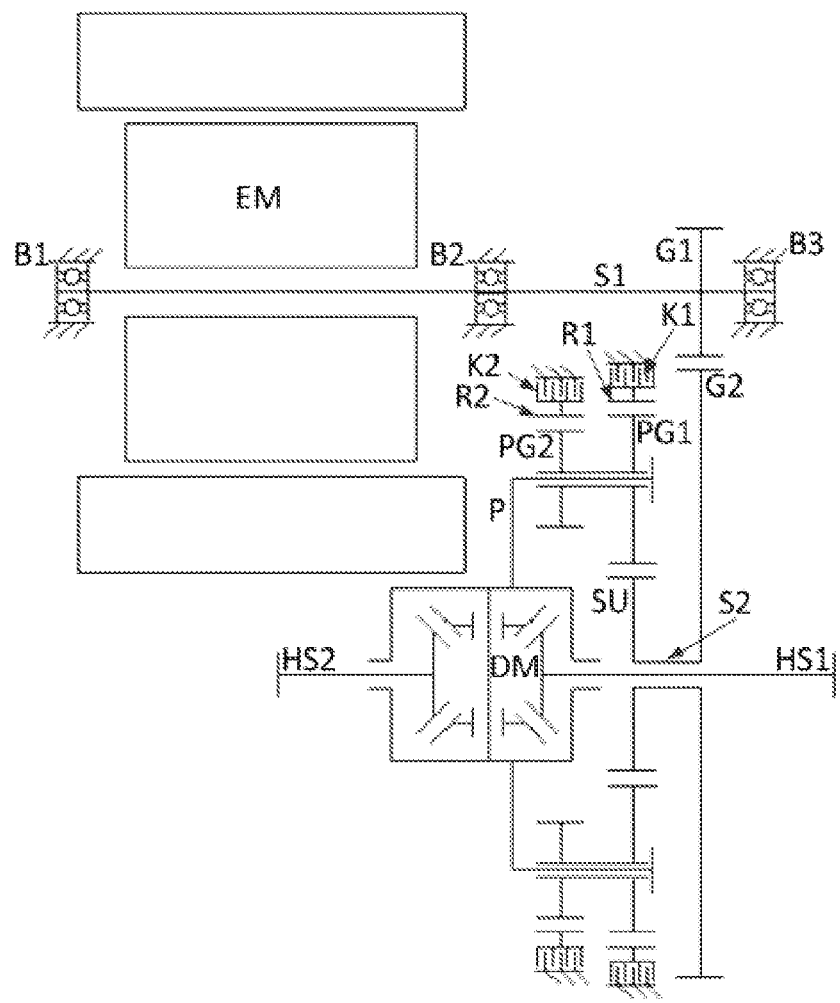
FIG. 2B is a schematic diagram showing a connection structure of the two-gear bridge driving system according to the second embodiment.

In this embodiment, as shown in FIG. 2B, the output shaft S1 of the electric motor EM is supported by the first bearing B1, the second bearing B2, and the third bearing B3, wherein the first bearing B1 supports the other side end of the output shaft S1 in the axial direction. At the end, the second bearing B2 supports a substantially central portion of the output shaft S1, and the third bearing B3 supports one end of the output shaft S1 in the axial direction. The electric motor output gear G1 is fixedly mounted on the portion, between the second bearing B2 and the third bearing B3, of the output shaft S1, so in this embodiment, such cantilever structure as that of the first embodiment is not formed. Further, since the output shaft S1 is longer in this embodiment and the electric motor output gear G1 is located further away from the electric motor EM in the axial direction, the dual-planetary gear mechanism and the differential mechanism DM are disposed on the other axial side of the speed changer input gear G2. In addition, the first half shaft HS1 extends through the hollow input shaft S2 toward one axial side, and the second half shaft HS2 extends toward the other axial side.

The two-gear bridge driving system according to the second embodiment can realize the same function as the two-gear bridge driving system according to the first embodiment.

The specific structure of the two-gear bridge driving system according to the second embodiment has been described above, and the specific structure of the two-gear bridge driving system according to the third embodiment will be described below.

The structure of the two-gear bridge driving system according to the third embodiment.

The basic structure of the two-gear bridge driving system according to the third embodiment is roughly the same as the basic structure of the two-gear bridge driving system according to the first embodiment, and only the differences between the two will be described below.

Figure 2C:
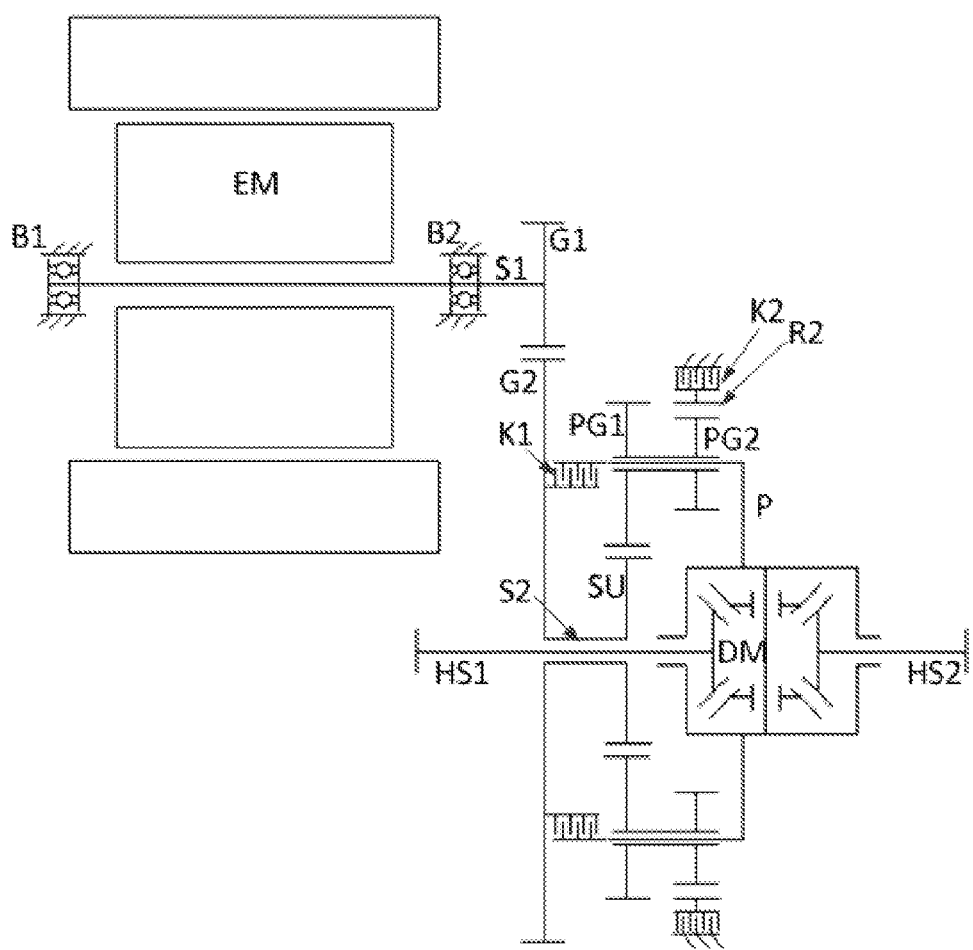
FIG. 2C is a schematic diagram showing a connection structure of the two-gear bridge driving system according to the third embodiment.

In this embodiment, as shown in FIG. 2C, the first ring gear R1 is omitted, and the first clutch K1 is disposed between the planetary carrier P and the speed changer input gear G2, so that the engagement of the first clutch K1 enables the planetary carrier P and the speed changer input gear G2 to be fixed together, making the planetary carrier P and the sun gear SU fixed together.

Therefore, in this embodiment, when the first clutch K1 is engaged, the torque transmission path from the electric motor EM is as follows: electric motor EM→output shaft S1→electric motor output gear G1→speed changer input gear G2→planetary carrier P→differential mechanism DM; and the speed changer can achieve the following first transmission ratio:$Z_{G2}/Z_{G1}$, wherein $Z_{G1}$ is the number of teeth of the electric motor output gear G1, and $Z_{G2}$ is the number of teeth of the speed changer input gear G2.

In this embodiment, when the second clutch K2 is engaged, the torque transmission path from the electric motor EM is as follows: electric motor EM→output shaft S1→electric motor output gear G1→speed changer input gear G2→input shaft S2→sun gear SU→first planetary gear PG1→second planetary gear PG2→planetary carrier P→differential mechanism DM; and the speed changer can achieve the following second transmission ratio:$(1+ZR_{R2}/Z_{SU})\times(Z_{PG1}/Z_{PG2})\times(Z_{G2}/Z_{G1})$, wherein $Z_{R2}$ is the number of teeth of the second ring gear R2, $Z_{SU}$ is the number of teeth of the sun gear SU, $Z_{PG1}$ is the number of teeth of the first planetary gear PG1, $Z_{PG2}$ is the number of teeth of the second planetary gear PG2, $Z_{G1}$ is the number of teeth of the electric motor output gear G1, and $Z_{G2}$ is the number of teeth of the speed changer input gear G2.

The specific structure of the two-gear bridge driving system according to the third embodiment has been described above, and the specific structure of the two-gear bridge driving system according to the fourth embodiment will be described below.

The structure of the two-gear bridge driving system according to the fourth embodiment.

The basic structure of the two-gear bridge driving system according to the fourth embodiment is roughly the same as the basic structure of the two-gear bridge driving system according to the third embodiment, and only the differences between the two will be described below.

Figure 2D:
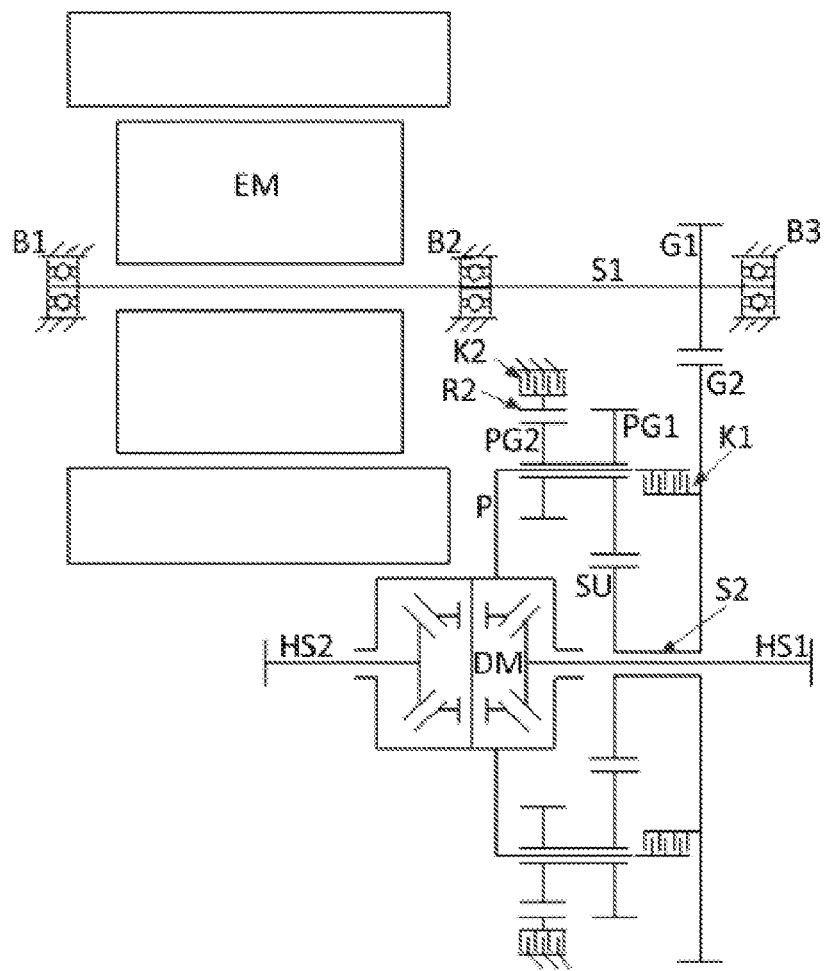
FIG. 2D is a schematic diagram showing a connection structure of the two-gear bridge driving system according to the fourth embodiment.

In this embodiment, as shown in FIG. 2D, the output shaft S1 of the electric motor EM is supported by the first bearing B1, the second bearing B2, and the third bearing B3, wherein the first bearing B1 supports the other side end of the output shaft S1 in the axial direction. At the end, the second bearing B2 supports a substantially central portion of the output shaft S1, and the third bearing B3 supports one end of the output shaft S1 in the axial direction. The electric motor output gear G1 is fixedly mounted on the portion, between the second bearing B2 and the third bearing B3, of the output shaft S1, so in this embodiment, such cantilever structure as that of the third embodiment is not formed. Further, since the output shaft S1 is longer in this embodiment and the electric motor output gear G1 is located further away from the electric motor EM in the axial direction, the dual-planetary gear mechanism and the differential mechanism DM are disposed on the other axial side of the speed changer input gear G2. In addition, the first half shaft HS1 extends through the hollow input shaft S2 toward one axial side, and the second half shaft HS2 extends toward the other axial side.

In addition, the present disclosure also provides a vehicle comprising the two-gear bridge driving system with the above structure.

Although the specific technical solutions of the present disclosure have been described in detail in the specific embodiments, still the following need to be noted.

i. Although it is not explicitly described in the above specific embodiments, it should be understood that the output shaft S1 of the electric motor EM is connected to the dual-planetary gear mechanism via first-stage reduction mechanisms (the electric motor output gear G1 and the speed changer input gear G2). In addition, in each of the above embodiments, in addition to outputting the torque for driving to the speed changer, the electric motor EM can also receive the torque from the speed changer for battery charging.

ii. Although it is not explicitly described in the above specific embodiments, it should be understood that a larger second transmission ratio can be obtained in each embodiment, thus allowing the two-gear bridge driving system according to the present disclosure to use an electric motor with a lower power to reduce costs.

iii. Although it is not explicitly described in the above specific embodiments, it should be understood that the clutch of the two-gear bridge driving system according to the present disclosure utilizes the housing of the speed changer, thus contributing to a simplified clutch in composition and structure, reduced costs, and improved stability; in addition, the planetary gear mechanism of the two-gear bridge driving system according to the present disclosure has fewer components, which is more cost saving.

iv. Compared with the two-gear bridge driving system in the prior art, the two-gear bridge driving system according to the present disclosure can utilize the axial space more effectively and has a more compact structure.

v. Although it is not explicitly described in the above specific embodiments, it should be understood that $Z_{G2} > Z_{G1}$, $Z_{PG1} > Z_{PG2}$, $Z_{R2} > Z_{SU}$, $Z_{R1} > Z_{SU}$; in addition, when the transmission ratio is calculated according to the above formulas in each embodiment, the modulus of each gear may be the same.

The invention claimed is:

1. A two-gear bridge driving system, comprising:
an electric motor having an output shaft; and
a speed changer comprising an input shaft configured to be drivingly coupled to the output shaft, a dual-planetary gear mechanism, a first clutch and a second clutch;
the dual-planetary gear mechanism comprises one sun gear, a first planetary gear, a second planetary gear, a planetary carrier, and a first ring gear and a second ring gear, the sun gear is fixed to the input shaft and is always in engagement with the first planetary gear, the first planetary gear and the second planetary gear are fixed to one another, the first ring gear and the first planetary gear are always in an engagement state, the second ring gear and the second planetary gear are always in an engagement state, and the planetary carrier is configured to transmit torque to outside;
engagement of the first clutch enables the first ring gear to be fixed with respect to a housing of the speed changer, and disengagement of the first clutch allows the first ring gear to rotate relative to the housing of the speed changer; and
engagement of the second clutch enables the second ring gear to be fixed with respect to the housing of the speed changer, and disengagement of the second clutch allows the second ring gear to rotate relative to the housing of the speed changer;
wherein the input shaft of the speed changer is parallel to the output shaft of the electric motor, and the input shaft is offset relative to the output shaft;
wherein the electric motor has an electric motor output gear fixed to the output shaft, the speed changer comprises a speed changer input gear fixed to the input shaft, the speed changer input gear and the electric motor output gear are always in an engagement state, and the first planetary gear is closer to a side where the speed changer input gear is located than the second planetary gear; and wherein the first clutch is disposed between the speed changer input gear and the planetary carrier, and the first clutch enables the speed changer input gear to be fixed with respect to the planetary carrier, so that the sun gear is fixed with respect to the planetary carrier.

2. The two-gear bridge driving system according to claim 1, further comprising a differential mechanism and two half shafts protruding from the differential mechanism, the planetary carrier is drivingly coupled to a differential mechanism housing of the differential mechanism, and
the two half shafts and the input shaft are in a co-axial arrangement, and the input shaft is a hollow shaft, so that one of the two half shafts passes through the input shaft and is rotatable independently of the input shaft.

3. The two-gear bridge driving system according to claim 1, wherein the first clutch and the second clutch are both wet multi-plate clutches.

4. A vehicle comprising the two-gear bridge driving system according to claim 1.

5. A two-gear bridge driving system, comprising:
an electric motor having an output shaft;
a speed changer comprising an input shaft to be drivingly coupled to the output shaft, a dual-planetary gear mechanism, a first clutch and a second clutch;
the dual-planetary gear mechanism comprises one sun gear, a first planetary gear, a second planetary gear, a planetary carrier, and a second ring gear, the sun gear is fixed to the input shaft and is always in engagement with the first planetary gear, the first planetary gear and the second planetary gear are fixed to one another, the second ring gear and the second planetary gear are always in an engagement state, and the planetary carrier is configured to transmit torque to outside;
engagement of the first clutch enables the planetary carrier to be fixed with respect to the sun gear, and disengagement of the first clutch allows the planetary carrier to rotate relative to the sun gear; and
engagement of the second clutch enables the second ring gear to be fixed with respect to a housing of the speed changer, and disengagement of the second clutch allows the second ring gear to rotate relative to the housing of the speed changer.

6. The two-gear bridge driving system according to claim 2, wherein the input shaft of the speed changer is parallel to the output shaft of the electric motor, and the input shaft is offset relative to the output shaft.

7. The two-gear bridge driving system according to claim 6, wherein the electric motor has an electric motor output gear fixed to the output shaft, the speed changer comprises a speed changer input gear fixed to the input shaft, the speed changer input gear and the electric motor output gear are always in an engagement state, and the first planetary gear is closer to a side where the speed changer input gear is located than the second planetary gear.

8. The two-gear bridge driving system according to claim 7, wherein the first clutch is disposed between the speed changer input gear and the planetary carrier, and the first clutch enables the speed changer input gear to be fixed with respect to the planetary carrier, so that the sun gear is fixed with respect to the planetary carrier.

9. The two-gear bridge driving system according to claim 7, wherein the electric motor output gear is disposed at one side end of the output shaft in an axial direction to form a cantilever structure, and the electric motor and the dual-planetary gear mechanism are located on two opposite sides of the electric motor output gear in the axial direction, respectively.

10. The two-gear bridge driving system according to claim 7, wherein the electric motor output gear is disposed at an intermediate position of the output shaft other than two side ends thereof in an axial direction, and the two side ends of the output shaft in the axial direction are supported by bearings, and the electric motor and the dual-planetary gear mechanism are located on a same side of the motor output gear in the axial direction.

11. The two-gear bridge driving system according to claim 5, further comprising a differential mechanism and two half shafts protruding from the differential mechanism, the planetary carrier is drivingly coupled to a differential mechanism housing of the differential mechanism, and the two half shafts and the input shaft are in a co-axial arrangement, and the input shaft is a hollow shaft, so that one of the two half shafts passes through the input shaft and is rotatable independently of the input shaft.

12. The two-gear bridge driving system according to claim 5, wherein the first clutch and the second clutch are both wet multi-plate clutches.

13. A vehicle comprising the two-gear bridge driving system according to claim 5.

14. A two-gear bridge driving system, comprising:

an electric motor having an output shaft; and a speed changer comprising an input shaft configured to be drivingly coupled to the output shaft, a dual-planetary gear mechanism, a first clutch and a second clutch:

the dual-planetary gear mechanism comprises one sun gear, a first planetary gear, a second planetary gear, a planetary carrier, and a first ring gear and a second ring gear, the sun gear is fixed to the input shaft and is always in engagement with the first planetary gear, the first planetary gear and the second planetary gear are fixed to one another, the first ring gear and the first planetary gear are always in an engagement state, the second ring gear and the second planetary gear are always in an engagement state, and the planetary carrier is configured to transmit torque to outside;

engagement of the first clutch enables the first ring gear to be fixed with respect to a housing of the speed changer, and disengagement of the first clutch allows the first ring gear to rotate relative to the housing of the speed changer;

engagement of the second clutch enables the second ring gear to be fixed with respect to the housing of the speed changer, and disengagement of the second clutch allows the second ring gear to rotate relative to the housing of the speed changer;

wherein the input shaft of the speed changer is parallel to the output shaft of the electric motor, and the input shaft is offset relative to the output shaft;

wherein the electric motor has an electric motor output gear fixed to the output shaft, the speed changer comprises a speed changer input gear fixed to the input shaft, the speed changer input gear and the electric motor output gear are always in an engagement state, and the first planetary gear is closer to a side where the speed changer input gear is located than the second planetary gear; and wherein the electric motor output gear is disposed at an intermediate position of the output shaft other than two side ends thereof in an axial direction, and the two side ends of the output shaft in the axial direction are supported by bearings, and the electric motor and the dual-planetary gear mechanism are located on a same side of the motor output gear in the axial direction.

15. The two-gear bridge driving system according to claim 14, further comprising a differential mechanism and two half shafts protruding from the differential mechanism, the planetary carrier is drivingly coupled to a differential mechanism housing of the differential mechanism, and the two half shafts and the input shaft are in a co-axial arrangement, and the input shaft is a hollow shaft, so that one of the two half shafts passes through the input shaft and is rotatable independently of the input shaft.

16. The two-gear bridge driving system according to claim 14, wherein the first clutch and the second clutch are both wet multi-plate clutches.

17. A vehicle comprising the two-gear bridge driving system according to claim 14.

* * * * *